United States Patent Office 3,487,738
Patented Jan. 6, 1970

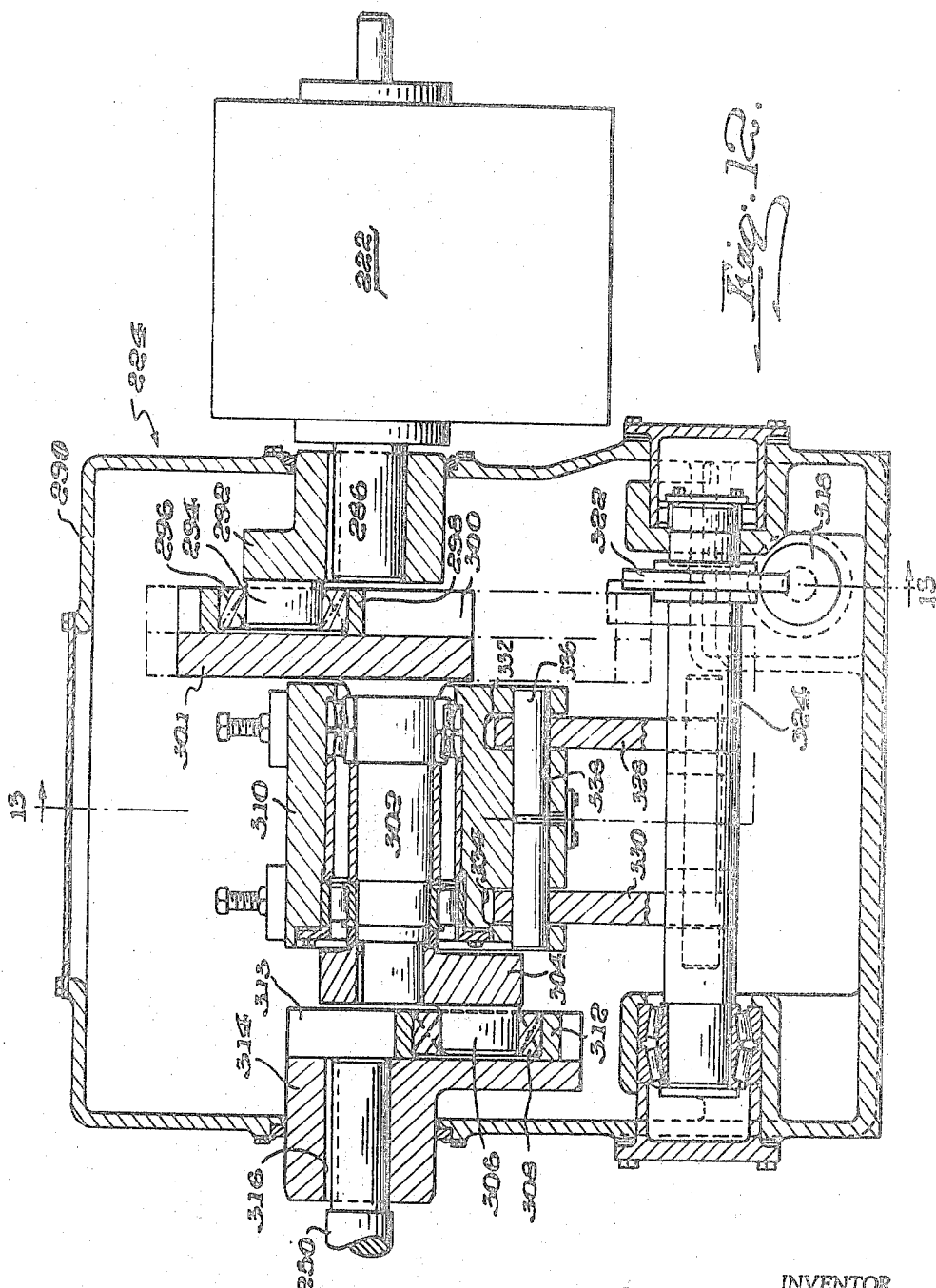

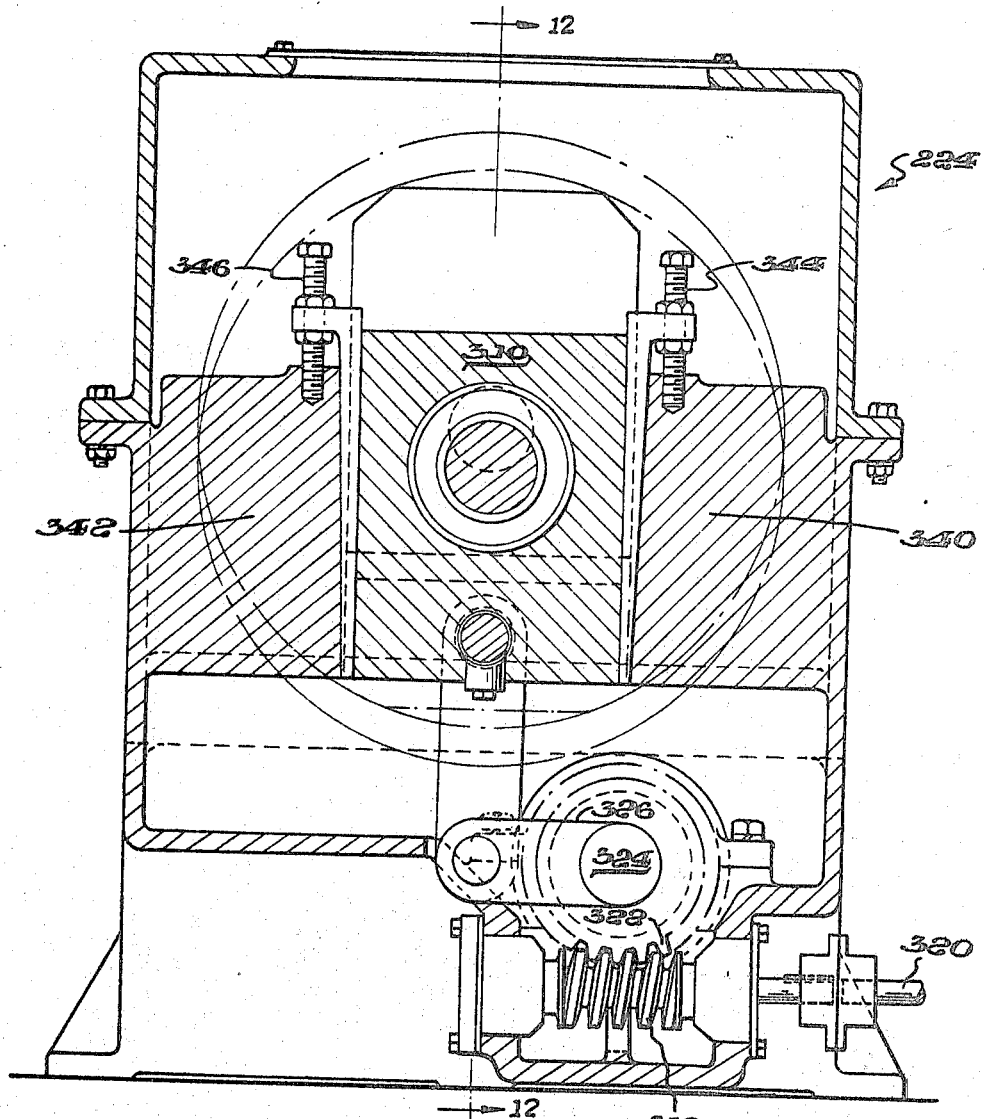

3,487,738
APPARATUS FOR CUTTING A CONTINUOUSLY MOVING STRIP OF MATERIAL
Gerald L. Bearer, Pittsburgh, Pa., assignor to Voss Engineering Company, Pittsburgh, Pa., a corporation of Pennsylvania
Original application Jan. 8, 1964, Ser. No. 336,442, now Patent No. 3,342,092, dated Sept. 19, 1967. Divided and this application Jan. 26, 1967, Ser. No. 623,163
Int. Cl. B23d 25/10
U.S. Cl. 83—316    3 Claims

ABSTRACT OF THE DISCLOSURE

This disclosure relates to a shear device for shearing a moving strip of material. A carriage is pivotally connected to a frame and has an upper blade carrier secured thereto. A lower blade carrier is slidably positioned in the carriage below the upper blade carrier. An actuator is connected to the lower blade carrier and arranged to move the lower blade carrier toward and away from the upper blade carrier. An oscillator pivotally reciprocates the carriage to move the blade carriers through an arcuate path. The oscillator and actuator are interconnected so that the blade carrier oscillates at a speed substantially equal to the speed of a moving strip.

---

This application is a division of application Ser. No. 336,442, filed Jan. 8, 1964, now Patent No. 3,342,092, issued Sept. 19, 1967.

This invention relates to apparatus for cutting a continuously moving strip of material and more particularly to a die shear machine for cutting a continuously moving metal sheet or strip into sections of predetermined length.

In prior shearing machines and devices, the cutting of a continuously moving strip of material into sections of predetermined length utilized means to compensate for the retardation or momentary stopping of the moving strip at the shearing machine when the strip was momentarily engaged by the shearing blades. A curvature was imparted to the advancing metal strip so that upon engagement of the blades with the moving strip, the hump or curvature in the strip was automatically increased to compensate for the retardation of the strip as it was engaged by the blades. Under certain conditions, means were provided to form an initial curvature in the advancing metal strip before it reached the shearing blade. The amount of this curvature was, in certain instances, controlled by the variation in the predetermined length of the sections cut from the strip.

It is proposed by this invention to provide a novel shearing apparatus which operates with a continuously moving metal strip to cut the metal strip into predetermined lengths without initially imparting a curvature to the metal strip, thereby eliminating the necessity of changing the rate of travel of the metal strip as it approaches the shear blade. The shearing apparatus of this invention is of simpler structure, yet provides greater accuracy in cutting metal strips into predetermined lengths.

Briefly, the invention includes a support frame, a carriage movable relative thereto in a rectilinear direction parallel to the longitudinally extending pass line of the strip material to be cut. The carriage includes an upper blade carrier and a lower blade carrier with each blade carrier having cooperative shearing blades. The upper blade carrier is fixedly secured to the carriage and the lower blade carrier is slidably mounted on the carriage for movement toward and away from the upper blade carrier and in a direction substantially normal to the pass line. Means are provided for moving the carriage in a generally rectilinear direction in timed relationship with the movement of the lower blade carrier in its normal rectilinear direction toward and away from the upper blade carrier so that the carriage is moving in the same direction as the metal strip to be cut and at the same velocity as the metal strip when the lower blade carrier with its associated shear blade moves upwardly into shearing relationship with the shear blade in the upper blade carrier.

Accordingly, it is an object of this invention to provide an improved shearing apparatus which performs a shearing cut on a strip of material by shearing means which are moving in the same direction as the strip of material and at the same speed as the strip of material at the time of the shearing cut.

Another object of this invention is to provide cam type drive means for shearing apparatus that is arranged to move the shear blades in the same direction as the metal strip and at the same speed as the metal strip during the shearing cut.

It is a further object of this invention to provide shearing apparatus that performs an accurate shearing cut on a continuously moving metal strip.

Still another object of this invention is to provide a die shear apparatus which performs a shearing operation on a continuously moving metal strip without resort to initially curving the advancing metal strip.

These and other objects of the invention will become more apparent upon consideration of the following detailed description of the preferred embodiment thereof, when taken in conjunction with the following drawings, in which:

FIGURE 11 is a side elevational view of the cutter frame member illustrated in FIGURE 8.

FIGURE 12 is a sectional view in side elevation of a synchronizing crank device taken along the lines 12—12 in FIGURE 13.

FIGURE 13 is a sectional view in front elevation of the synchronizing crank device taken along the lines 13—13 in FIGURE 12.

Figure 1:
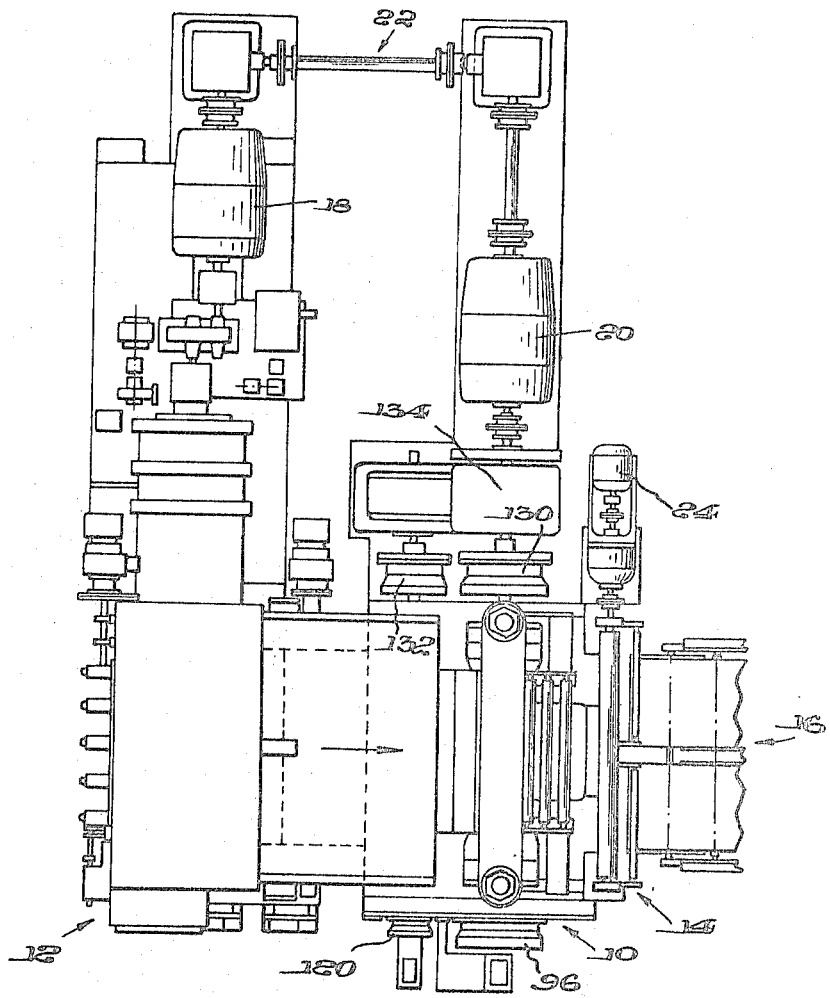
FIGURE 1 is a plan view of one embodiment of the invention positioned in a sheet metal strip pass line with a leveler device arranged to straighten the sheet metal strip before it is cut into sections by the shearing apparatus.

Referring to the drawings and particularly to FIGURES 1–6, there is illustrated one embodiment of the improved shearing apparatus. In FIGURE 1 the shear, generally designated by the numeral 10, is positioned in a pass line that includes a leveler 12. The leveler 12 straightens the sheet metal strip as it is unwound from a coil positioned on the lefthand side of the leveler 12 as viewed in FIGURE 1. The sheet metal strip passes through the leveler 12 in the direction indicated by the arrow and is fed at a predetermined speed to the shear 10. Driven pinch rolls 14 are positioned adjacent the shear 10 and are arranged to convey the cut sections of strip material onto a suitable conveyor 16. The lever 12 may be similar to the leveler illustrated in U.S. Patent No. 2,365,114, assigned to the assignee of the present invention.

The leveler 12 has a drive motor 18 connected thereto through suitable gearing and control devices, as is well known in the art. Similarly, the shear 10 has a motor 20 which actuates the shear 10 in a manner to be later described. The motors 18 and 20 are connected to each other by shafting and gearing, generally designated by the numeral 22. The pinch rolls 14 have drive motor 24 associated therewith.

As the sheet metal strip is unwound from a coil (not shown) it is fed to the leveler 12 at a predetermined speed. The lever 12 straightens the sheet metal strip and feeds it to the shear 10 where the strip is cut into sections of preselected length. The sheet metal strip moves continuously at a fixed speed from the leveler 12 to the shear 10. During each shearing cut of the sheet metal strip by the shear blades of shear 10, the portion of the the shear 10 associated with the shear blades is moving in the same direction as the moving sheet metal strip and at the same speed as the sheet metal strip. With this arrangement the sheet metal strip does not buckle or bend between the leveler 12 and shear 10 during the shearing action. The timed movement of the shear blades in the same directions as the moving sheet metal strip and the upward movement of the lower shear blade into cutting relation with the upper shear blade requires the shear 10 to be timed and synchonized with the leveler 12.

Figure 2:
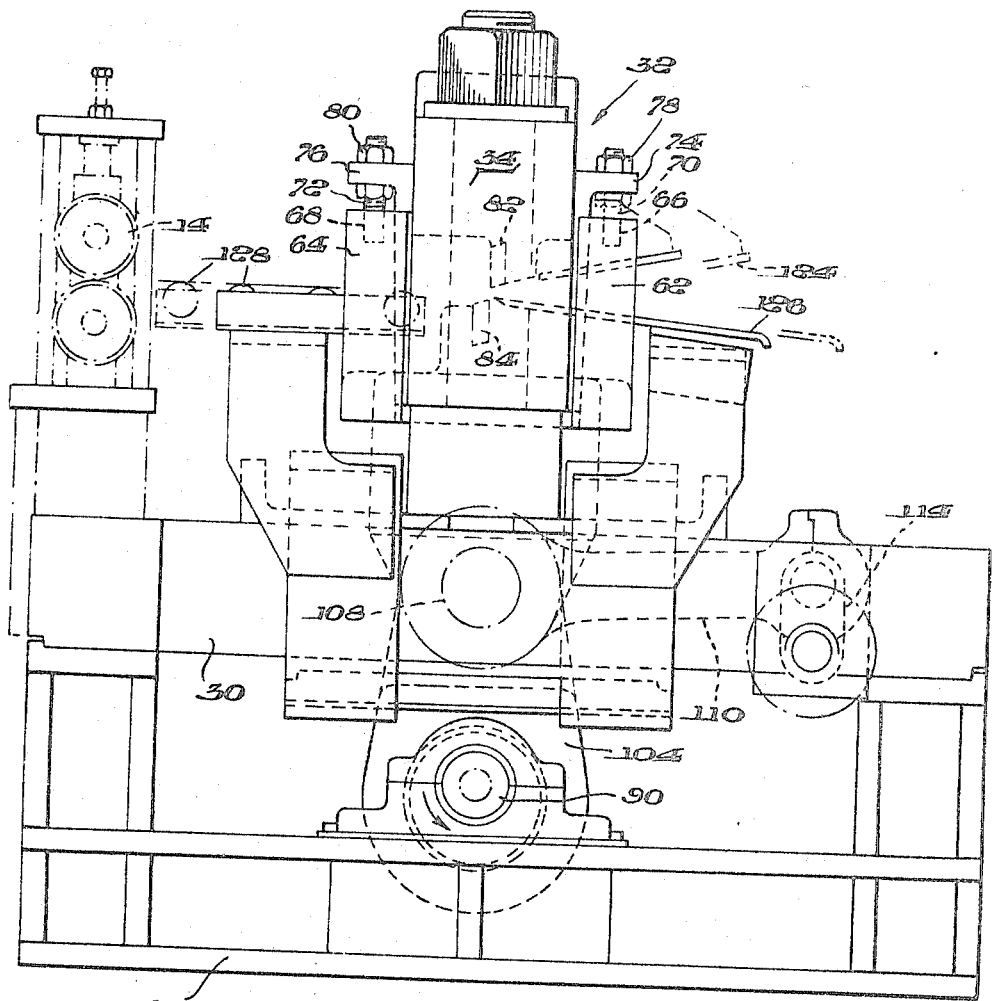
FIGURE 2 is a view in side elevation of the shearing apparatus illustrated in FIGURE 1.
Figure 3:
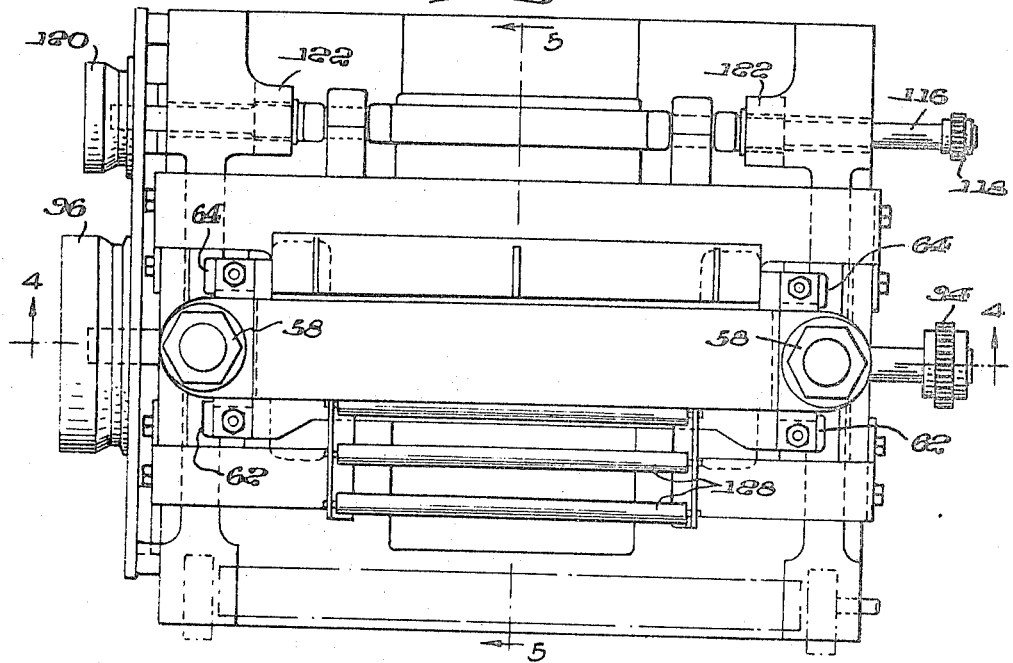
FIGURE 3 is a plan view of the shearing apparatus illustrated in FIGURES 1 and 2.

The shear 10 illustrated in FIGURE 1 is shown in detail in FIGURES 2-6. The shear 10 has a supporting frame 26 that is fixedly positioned on the mill floor in spaced relation to the leveler 12 and has a pair of horizontal rail portions 28 and 30. Reciprocally movable on the rails 28 and 30 is a carriage, generally designated by the numeral 32. The carriage includes an upper blade carrier 34 and a lower blade carrier 36. The upper blade carrier 34 is formed in three pieces to permit assembly of the lower blade carrier thereon for vertical movement of the lower blade carrier 36 relative to the upper blade carrier 34. The upper blade carrier 34 has a body portion 38 with a pair of vertical bores 40 and 42 extending therethrough. A pair of horizontal guides 44 and 46 have vertical threaded bores 48 and 50. Bolts 52 and 54 are threadedly secured in the bores 48 and 50 and extend upwardly therefrom. The upper blade carrier body portion is positioned in overlying relation with the horizontal guide members 44 and 46 with the bolts 52 and 54 extending upwardly through bores 40 and 42. Nuts 56 and 58 are arranged to secure the upper blade carrier body portion 34 to the horizontal guides 44 and 46. The lower blade carrier 36 has a horizontal body portions 60 with a pair of vertical side extensions 62 and 64 adjacent each end that are arranged in slidable relation with the side walls of the upper blade carrier body portion 38. To assemble the carriage 32 the lower blade carrier 36 is positioned between the depending portions of the upper blade carrier body portion 38 with the side extensions 62 and 64 in juxtaposition with the side walls of the body portion 38. The horizontal guides 44 and 46 are positioned in abutting relation with the depending portions of the body portion 38 with the bolts 52 and 54 extending through the bores 40 and 42 in the body portion 38. The nuts 56 and 58 secure the guide members 44 and 46 to the body portion 38 with the lower blade carrier 36 movable in a vertical direction relative to the upper blade carrier 34. The members 62 and 64 have threaded bores 66 and 68 therein, as illustrated in FIGURES 2 and 3. Bolts 70 and 72 are threadedly positioned in the bores 66 and 68 and wedge type adjusting gibs 74 and 76 are positioned between the side walls of body portion 38 and the side extensions 62 and 64 and are adjusted by means of nuts 78 and 80 to provide proper sliding clearance between lower blade carrier 36 and upper blade carrier 34 as well as adjusting the lower shear blade for purposes of cutting clearance and alignment. The upper blade carrier 34 has a horizontally extending shear blade 82 secured thereto and the lower blade carrier 36 has a mating horizontal blade 84 secured thereto. With this arrangement the lower blade carrier 36 is reciprocally movable toward and away from upper blade carrier 34 to move the lower shear blade 84 into cutting relation with the upper blade carrier shear blade 82.

The guides 44 and 46 have channel shaped portions 86 and 88 which are slidably positioned on the rails 28 and 30 of supporting frame 26. The carriage 32 is slidable in a horizontal direction on the rails 28 and 30 of fixed supporting frame 26. Thus the carriage 32 is movable in a horizontal plane and the lower shear blade carrier is movable in a vertical plane. There is provided drive means to both move the carriage 32 in a horizontal reciprocal manner and to move the blade in a vertical reciprocal manner.

Figure 4:
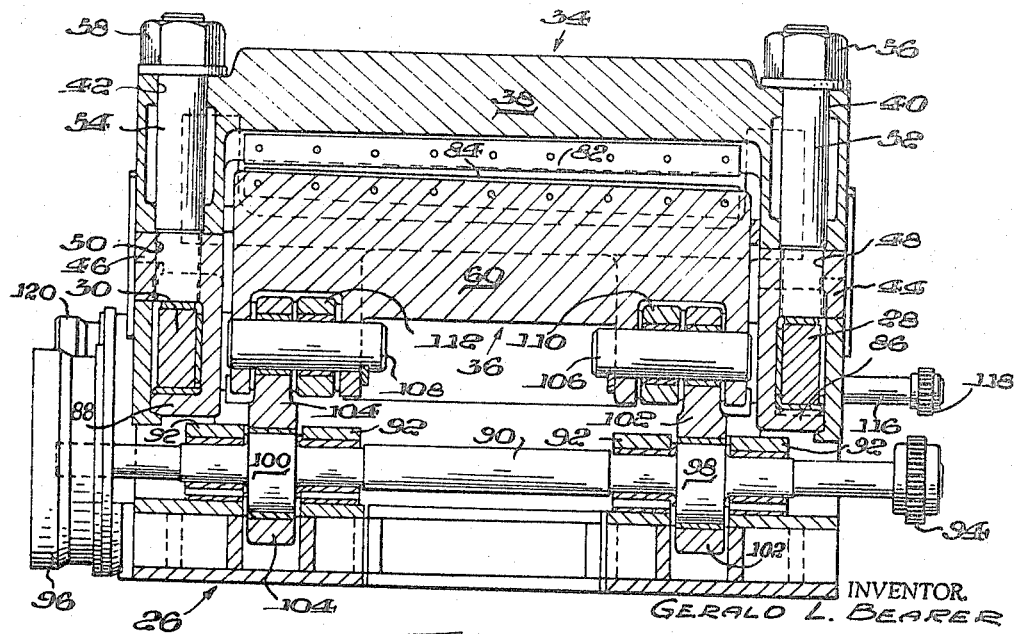
FIGURE 4 is a cross-sectional view taken along the lines 4—4 in FIGURE 3.

The drive means includes a shaft 90 that is rotatably supported in bearings 92 that are, in turn, secured to the supporting frame 26. The shaft 90 has a gear tooth flexible coupling 94 secured to one end and a disc brake 96 secured to the other end. The shaft 90 has a pair of cammed portions 98 and 100 which are positioned between the bearings 92. Connecting links 102 and 104 are journaled on the cam portions 98 and 100 and are actuated by the cam portions 98 and 100. The links 102 and 104 are arranged to move in a vertical direction upon actuation by the cams 98 and 100. The other ends of links 102 and 104 are rotatably connected to pins 106 and 108. The pins 106 and 108 are fixedly secured to the lower blade carrier body portion 60, as is illustrated in FIGURE 4. The links 102 and 104, however, are rotatable relative to the pins 106 and 108. Thus, with rotation of shaft 90, the cam portions 98 and 100 move the links 102 and 104 in a vertical direction to transmit vertical motion through pins 106 and 108 to lower blade carrier 36 and thus move the lower cutter blade 84 toward and away from upper shear blade 82.

Figure 5:
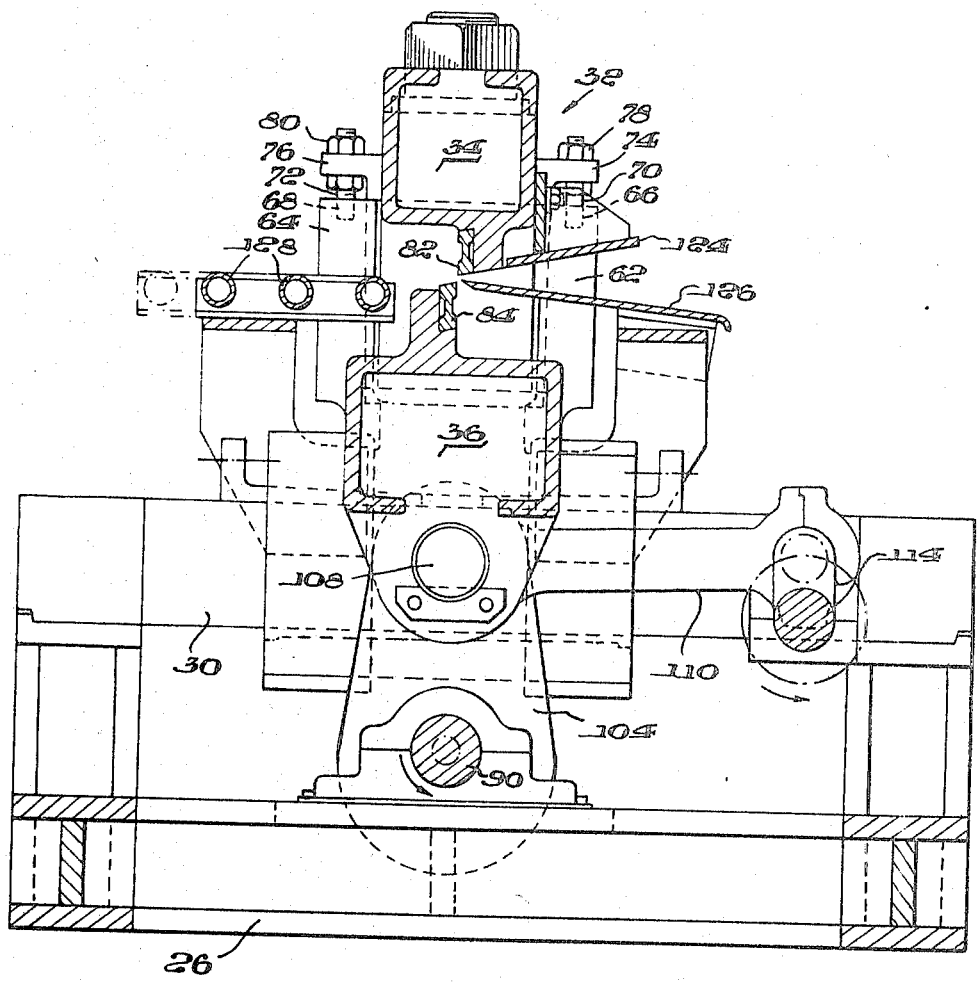
FIGURE 5 is a view in side elevation, partly in section, taken along the lines 5—5 in FIGURE 3.
Figure 6:
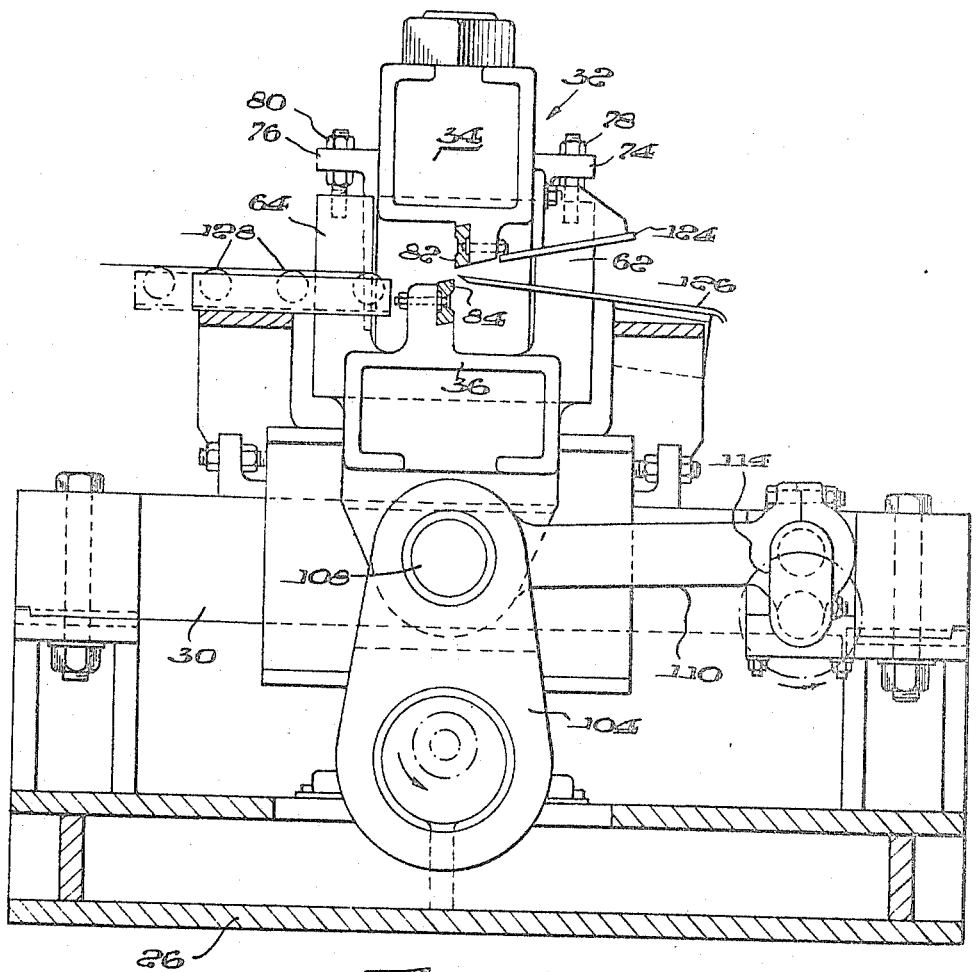
FIGURE 6 is a view in side elevation illustrating the embodiment of the shearing apparatus with portions thereof removed to more clearly show the parts.

As is best illustrated in FIGURES 2 and 5, a pair of Pitman arms 110 and 112 are rotatably connected at one end to the respective pins 106 and 108. The other ends of Pitman arms 110 and 112 are connected by means of a crank arm 114 to a shaft 116. The shaft 116, upon rotation, rotates the crank arm 114 to provide reciprocal movement to the Pitman arm 110. The Pitmans 110 and 112 being rotatably connected to pins 106 and 108 provide a reciprocal motion to the carriage 32. The shaft 116 has a gear tooth flexible coupling 118 secured to one end and a disc brake 120 secured to the other end. The shaft 116 is suitably positioned in bearings 122 fixedly secured to the supporting frame 26. Converging guide members 124 and 126 are suitably secured to the carriage 32 to guide the steel strip material toward the shear blades 82 and 84. Conveying rolls 128 are positioned on the opposite side of shear blades 82 and 84 and are arranged to convey the cut sections of strip material to the pinch rolls 14.

Referring to FIGURE 1, the shaft 90 through flexible coupling 94 is connected to a clutch 130 and shaft 116 is connected through flexible coupling 118 to a clutch 132. The shafts of clutches 130 and 132 are geared to each other through suitable gearing means positioned in housing 134. With this arrangement, motor 20, through gearing in housing 134, drives shafts 116 and 90 through clutches 130 and 132 in timed relationship so that the crank arm 114 is in a top dead center position at the same time that cams 98 and 100 on shaft 90 are at top dead center. It will be apparent that shaft 116 can make two or more revolutions for each revolution of shaft 90 as long as the timed relation of the cams 98 and 100 and crank arms 114 reach top dead center at the same time. The clutches 130 and 132 and disc brakes 96 and 120 are utilized as timing means actuated by a measuring and control means (not shown) to shear the strip material into sections of predetermined length. With this arrangement there is a timed relationship between the engagement of the clutches, the subsequent disengagement of the clutches and the engagement of the brakes to stop the motion of the shafts.

OPERATION

Embodiment I

The shearing apparatus illustrated in FIGURES 1–6 operates as follows. An elongated metal strip, usually relatively thin compared with its width, is unwound from a coil and is fed into the leveler 12 where it is straightened and is thereafter fed from the leveler 12 at a predetermined speed to the shear 10. The motor 20 that actuates the shear 10 is connected to the motor 18 that drives leveler 12 so that the leveler 12 and shear 10 are driven in synchronized timed relation to each other. The motor 20 drives shafts 90 and 116 through the gearing in housing 134 in timed relation to each other, as previously described. Rotation of shaft 116 drives crank arm 114 in a counterclockwise direction as viewed in FIGURES 2, 5 and 6 to thereby oscillate Pitman arms 110 and 112. The oscillation of Pitman arms 110 and 112 reciprocates the bottom blade carrier 36 which, through its connection with top blade carrier 34, reciprocates the carriage 32 comprising top blade carrier 34 and bottom blade carrier 36. During the reciprocating movement of carriage 32, the shaft 90 is driven in timed relation with shaft 116 and, in turn, rotates cam portions 98 and 100 on shaft 90. The rotation of cam portions 98 and 100 reciprocates links 102 and 104 upwardly and downwardly. Through the connection of pins 106 and 108, the links 102 and 104 vertically reciprocate the bottom blade carrier 36. Thus the bottom blade carrier 36 is moved upwardly and downwardly while the carriage 32 is moved reciprocally in a horizontal direction. Because of the arrangement of Pitmans 110 and 112, and the cammed portions 98 and 100 on shaft 90, when the lower blade carrier 36 reaches its uppermost point of travel the shearing blade 84 then cooperates with the shearing blade 82 to perform the shearing operation on the metal strip which is guided by the guide means 124 and 126. As the lower blade carrier 36 is moving upwardly for the shearing operation, the carriage 32 is moving horizontally in the direction of movement of the sheet metal strip. At the time that the shear blades 82 and 84 perform the shearing operation the carriage 32 is moving horizontally at substantially the same speed as the horizontal strip.

It will thus be noted that the relationship of the speed of shaft 116 and the length of crank 114 will determine the horizontal speed of the carriage 32. The horizontal speed of the carriage can be varied either by the speed of shaft 116 or the length of crank 114. The shearing cut is, therefore, performed by sheer blades 82 and 84 while the shear blades 82 and 84 are advancing in the same horizontal direction as the strip material and at the same speed as the strip material. Drag or interference of the metal strip is, therefore, eliminated during the shearing cut. After the shearing cut is made on the metal strip, the sheared portion leaves the shear 10 on the rolls 128 and is fed to the driven pinch rolls 14. After the shearing cut the shear blades 82 and 84 are separated by the downward vertical movement of shear blade 84 due to the downward movement of lower blade carrier 36. The downward movement of blade carrier 36 is controlled by the links 102 and 104 and the cammed portions 98 and 100 on shaft 90. The carriage 32 is moved horizontally on the supporting frame 26 by the continued rotation of shaft 116 while the continuously moving metal strip to be sheared is received by the guides 124 and 126 and fed between the separated shear blades 82 and 84. The sequence of operation is repeated for subsequent cuts of the sheet metal strip.

Embodiment II

Figure 7:
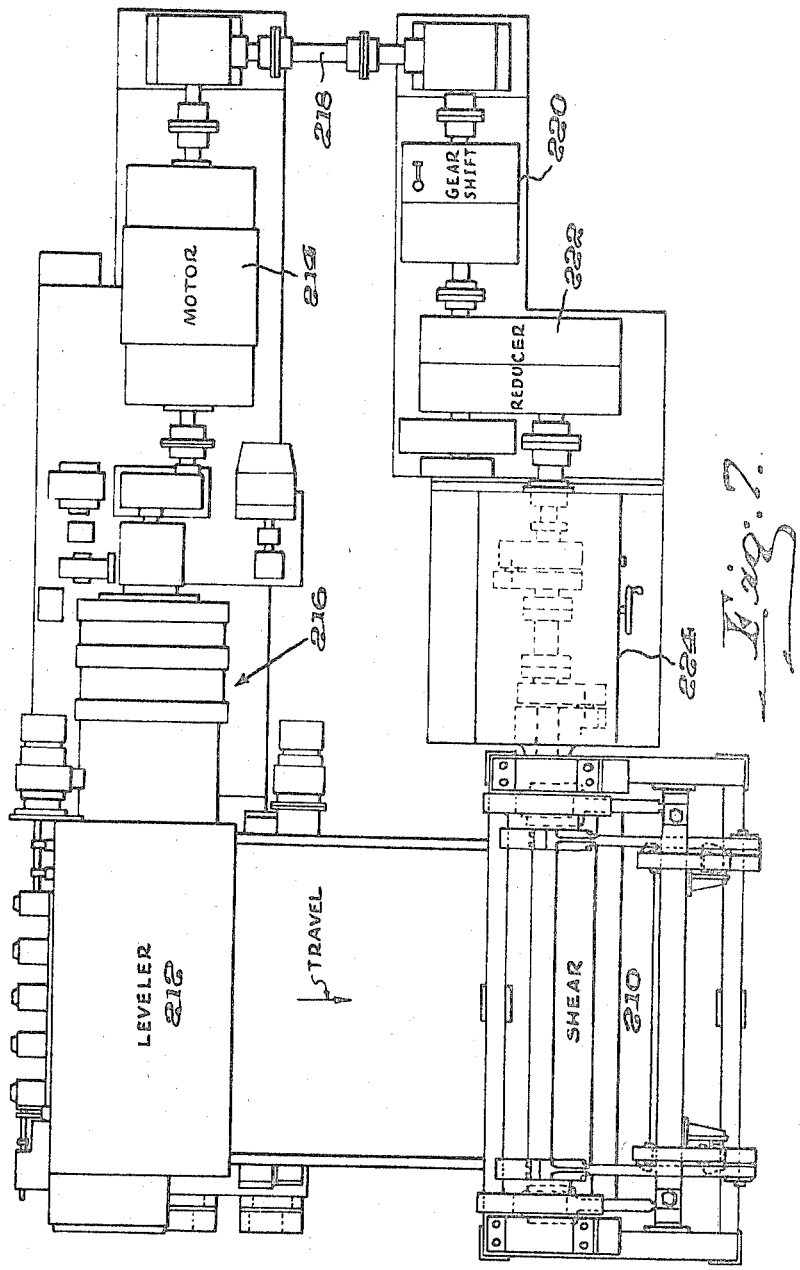
FIGURE 7 is a top plan view similar to FIGURE 1 illustrating another embodiment of the shearing apparatus.

In FIGURES 7–13 there is illustrated another embodiment of the shearing apparatus suitable for shearing a continuously moving metal strip into sections of predetermined lengh. FIGURE 7 illustrates the general arrangement of the shear 210 positioned in a shearing line with a leveler 212. The leveler 212 has a motor 214 connected through suitable drive means generally indicated by the numeral 216. The shear 210 is driven by the same motor 214 through cross connecting gearing and shafting 218, transmission 220, designated gear shift in FIGURE 1, a reducer 222 and a variable synchronizing crank device 224. Thus, in this embodiment a single drive motor 214 propels both the leveler 212 and the shear 210 in synchronous timed relation with each other.

The shear 210 is illustrated in FIGURES 8–11 and includes supporting frame 226 fixedly secured to the mill floor. A cutter frame generally designated by the numeral 228 is pivotally secured to the support frame 226. The cutter frame 228 has a pair of spaced vertically extending side members 230 and 232 that are maintained in spaced relation to each other by a top horizontal beam 234 and a lower shaft 236. The shaft 236 is pivotally secured in the support frame 226 so that the cutter frame 228 is pivotable about the axis of shaft 236.

Figure 8:
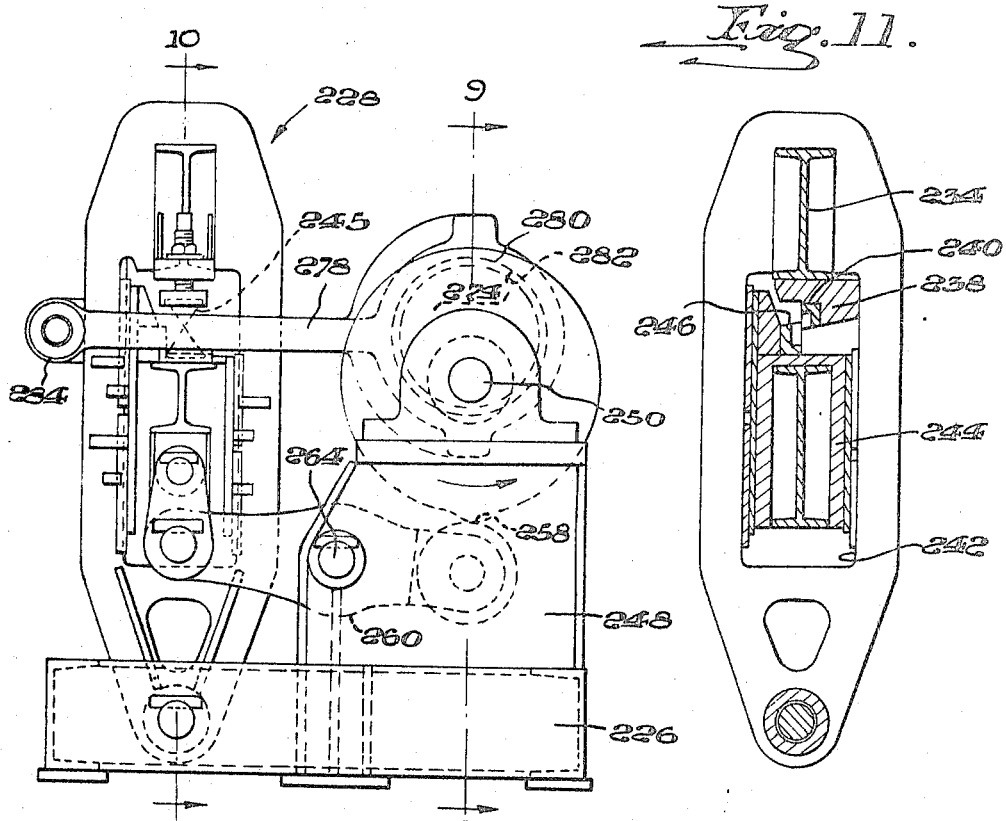
FIGURE 8 is a view in side elevation of the shearing apparatus illustrated in FIGURE 7.
Figure 9:
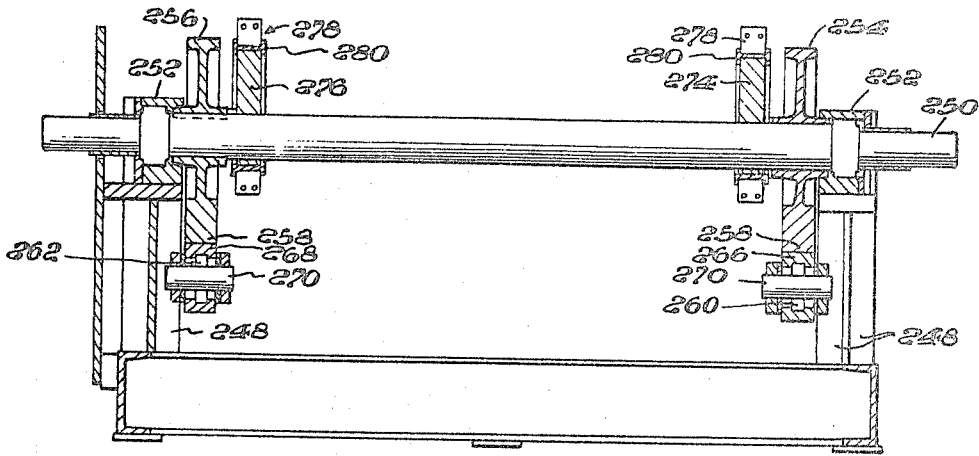
FIGURE 9 is a sectional view in front elevation taken along the lines 9—9 of FIGURE 8 illustrating a portion of the cam drive means.
Figure 10:
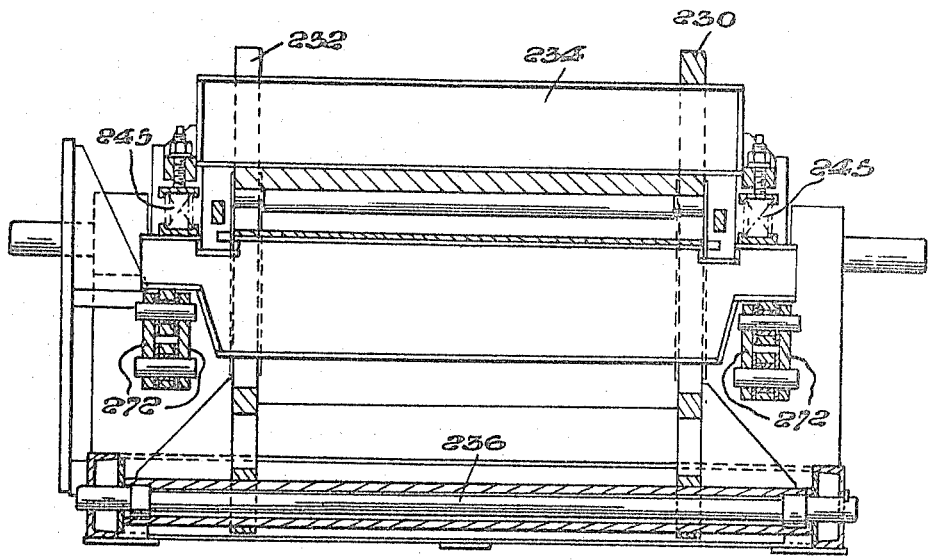
FIGURE 10 is another sectional view in front elevation taken along the lines 10—10 in FIGURE 8 and illustrating the cutter frame member.

The beam 234 has an upper blade carrier 238 secured thereto and depending therefrom. A shear blade 240 is secured to the carrier 238. The side members 230 and 232 have intermediate rectangular aligned apertures 242 in which there is positioned a horizontal member 244. The horizontal member 244 is slidably movable in a vertical direction in the slotted apertures 242. A bottom shear blade 246 is secured to the upper portion of horizontal member 244 and is movable into shearing relation with upper shear blade 240 to perform a shearing operation on a metal strip therebetween. The other end portion of supporting frame 226 has upwardly extending supports 248 which rotatably support a shaft 250 in suitable fixed bearings 252. The shaft has secured thereto for rotation therewith a pair of cams 254 and 256 (FIGURES 8 and 9). The cams 254 and 256 have a peripheral protuberance 258 which is arranged to move the lower shear blade 246 into shearing operation with the upper shear blade 240.

The upwardly extending support members 248 have a pair of lever arms 260 and 262 pivotally secured thereto intermediate their end portions by pivot shaft 264. The end portion of arms 260 and 262 positioned beneath the cams 254 and 256 has rollers 266 and 268 rotatably secured therethrough by shafts 270. The rollers 266 and 268 are arranged to abut the peripheral edge of the cams 254 and 256 and pivot the lever arms 260 and 262 about shafts 264 when the protuberance 258 of cams 254 and 256 contact the rollers 266 and 268. The other ends of lever arms 260 and 262 are connected to the horizontal member 244 by a pair of links 272 so that upon downward movement of the rollers 266 and 268 the lever arms 260 move the horizontal member 244 upwardly to bring the lower shear blade 246 into shearing relation with the upper shear blade 240 as illustrated in FIGURE 11 to perform a shearing operation on a metal strip therebetween. Although the shaft 264 is illustrated as being fixedly secured to the frame, it should be understood that the shaft 264 could be mounted in an eccentric to provide preselected miscuts wherein the shear blades 240 and 246 do not move into shearing engagement when protuberances 258 contact the rollers 266 and 258. The relative dimension of the regularly curved portions of cams 254 and 256, the weight of the horizontal member 244 and springs 245 move the shear blades 240 and 246 away from each other to permit the passage of the metal strip therebetween during the period that the metal strip is being fed between the shearing blades 240 and 246.

The shaft 250 has nonrotatably secured thereto a pair of eccentric discs 274 and 276. A pair of connecting members 278 have an annular ring portion 280 with an inner circumferential dimension substantially equal to the outer circumferential dimension of cam discs 274 and 276. The connecting member ring end portions 280 are positioned on the cam discs 274 and 276 within the aperture 282 so that connecting members 278 move in a reciprocal, substantially horizontal direction as the shaft 250 rotates. The connecting member 278 therefore oscillates back and forth in timed relation with the rotation of the discs 274 and 276. The connecting members 278 are pivotally connected in their other end portion 284 to the members 230 and 232 so that the oscillation of connecting members 278 pivots the cutter frame 228 about the pivot axis of shaft 236. Although, as is illustrated in FIGURE 8, the connecting member 278 is connected to the far end of members 230 and 232, it should be understood that they may be pivotally connected thereto in any suitable manner to provide for oscillating movement for member 228 about shaft 236. It will be apparent from the above description that the shear 210 is arranged to shear the metal strip therebetween once per revolution of the shaft 250. Thus the duration of a revolution of shaft 250 determines the length of the section cut from the sheet metal strip.

In order to vary the length of the section of metal strip cut, the angular velocity of the shaft 250 may be regulated by the synchronizing crank mechanism illustrated in FIGURES 12 and 13. One feature of the shear 210 and the drive arrangement therefor is that the member 228 is moving at its maximum velocity in a direction of the movement of the sheet metal strip during the shearing operation. Thus, in the position illustrated in FIGURE 8 the cutter frame 228 is pivoting about shaft 236 and is pivoting in a counterclockwise direction at its maximum velocity. At that instant, as is illustrated in FIGURE 8, the protuberance 258 on cams 254 and 256 actuates the horizontal member 244 to move the lower shear blade 246 into shearing relation with upper shear blade 240.

The adjustable synchronizing crank mechanism 224 is illustrated in detail in FIGURES 12 and 13. In FIGURE 12 the crank mechanism 224 is illustrated connected to a reducer such as reducer 222. A drive shaft 286 extends into the crank housing 290 and is nonrotatably secured to a crank arm 292 within the housing 290. The crank arm 292 has a shaft end portion 294 with roller bearing 296 rotatably positioned thereon. The roller bearing 296 supports a housing 298 which is slidable in slotted portion 300 of adjustable block 301. The adjustable block 301 has a shaft portion 302 extending laterally therefrom which terminates in a crank arm 304 having a similar shaft end portion 306 on which is mounted a roller bearing 308 which supports a housing 312 slidable in slotted positioned in a vertically adjustable housing 310. The portion 313 of crank arm 314. The shaft 302 is rotatably positioned in a vertically adjustable housing 310. The shaft 250 is nonrotatably connected in a receiving bore 316 in arm 314. Thus rotation of shaft 286 is transmitted through crank arm 292, block 301, shaft 302, crank arm 304, and arm 314 to shaft 250.

The dimensions of the various components of the synchronizing crank mechanism 224 are so proportioned that the instantaneous angular velocity of shaft 250 may be adjusted by means of the crank mechanism 224 by moving the shaft 302 and its associated crank arm 304 and block 301 thereof in a vertical direction, i.e. in the plane of the drawing of FIGURE 12. The vertical adjustment of shaft 302 is accomplished by a worm gear adjusting means that includes a horizontally extending worm 318 rotatably secured within housing 290 and having an external shaft 320 connected thereto. The worm 318 mates with worm gear 322 nonrotatably secured to a shaft 324. The shaft 324 is rotatably secured in side walls of housing 290 by suitable bearing means. Extending laterally from shaft 324 are a pair of arms 326 which are connected to link members 328 and 330. The links 328 and 330 have end portions extending into recesses 332 and 334 in housing 310. A shaft 336 extends through suitable apertures in the links 328 and 330 and a mating bore 338 in housing 310. With this arrangement rotation of shaft 320 rotates worm 318 to rotate shaft 324 through worm 322 to pivot arms 326 therewith. Rotation of arms 326 moves links 328 and 330 in a vertical direction to adjust the relative position of housing 310. It will be apparent to those skilled in the art that other types of adjustment means may be substituted for this means for adjusting housing 310.

As viewed in FIGURE 13 the housing 290 has inwardly extending supports 340 and 342 which limit movement of the housing 310 to a vertical direction. Wedge type gibs are positioned between the supports 340 and 342 and the housing 310 to provide proper clearance for vertical movement. Adjusting bolts 344 and 346 are provided. The adjustment of shaft 302 by the adjusting shaft 320 varies the angular velocity of shaft 250 in relation to the input shaft 286.

OPERATION

The shearing apparatus described in FIGURES 7–13 operates as follows. An elongated metal strip is unwound from a coil and fed to leveler device 212 where the sheet metal strip is straightened and thereafter propelled at a preselected speed in the direction of the arrow in FIGURE 7. The sheet metal strip is received by guide means on the shear apparatus 210 and moves between shear blades 240 and 246. The shaft 250 is rotated by the motor 214 through the driving connections illustrated in FIGURE 7. The synchronizing crank 224 continuously varies the angular velocity of the shaft 250 so that, at the time the shearing cut is made, the horizontal speed of the cutter frame 228 and hence the shear knives 240 and 246 is synchronous with the speed of the strip. Varying the angular velocity of shaft 250 by this crank mechanism 224 allows this synchronous feature and at the same time permits a duration of a single revolution, and therefore length of cut sheet, to be independent of strip feed speed. The rotation of shaft 250 actuates the shear 210 by rotating the discs 274 and 276 and cams 254 and 256. The discs 274 and 276 impart an oscillatory movement of the cutter frame 228 through connecting members 278 which is so timed that the cutter frame 228 is moving in a direction from right to left as viewed in FIGURE 8 at a maximum velocity when the cam mechanism, comprising discs 274, 276, is at top dead center. The relative position of cams 254 and 256 and eccentric discs 274 and 276 on shaft 250 provides for the protuberance 258 to be at bottom dead center when the discs 274 and 276 are at top dead center. As previously described, the protuberance 258 pivots arms to move the horizontal member 244 upwardly to position shear blades 240 and 246 in shearing relation with each other.

Thus, the arms 278 impart a rocking movement to the cutter frame 228 about the shaft 236. The pivotal movement of cutter frame 228 imparts a substantially horizontal reciprocal movement to the upper blade carrier 238 and horizontal member 244. After the shearing action has been completed, the discs or cams 274 and 276 thereafter impart a movement from left to right as viewed in FIGURE 8 to the arms 278 thus effecting a clockwise pivoting movement to the cutter frame 228 about the axis of shaft 236 to position the shearing apparatus for the next shearing action. The shearing action of the blades 240 and 246 is in timed relation with the movement of cutter frame 228 from the right to the left as viewed in FIGURE 8 so that the shearing of the metal strip with the shear blades 240 and 246 is accomplished with no relative movement therebetween except the shearing action itself. Thus, the longitudinal movement of the metal strip to be sheared and the longitudinal movement of the shearing blades 240 and 246 are at the same velocity and in the same direction during the shearing action.

It should be understood that various modifications in the apparatus disclosed in both embodiments are contemplated and may be resorted to by those skilled in the art without departing from the spirit and scope of the invention as herein defined by the appended claims.

What is claimed is:

1. In a device for shearing a moving strip of material the combination comprising,
   a support frame,
   a carriage pivotally connected at one end to said support frame and extending upwardly therefrom,
   said carriage having an upper blade carrier fixedly secured thereto and a lower blade carrier slidably positioned in said carriage below said upper blade carrier,
   actuating means connected to said lower blade carrier and arranged to move said lower blade carrier toward and away from said upper blade carrier,
   oscillating means to pivotally reciprocate said carriage so that said blade carriers oscillate through a predetermined arcuate path relative to said support frame, said path of said blade carriers being nearly rectilinear while the blade carriers are engaged for the shearing action,
   means connecting said actuating means and said oscillating means, said blade carriers oscillating while engaged for shearing action at a speed substantially equal to the moving strip,
   a shaft rotatably journaled in said supporting frame in lateral spaced relation to said carriage,
   a pair of disc members coaxially positioned on said shaft and rotatable therewith,
   said disc members each having a protuberance thereon,
   a pair of levers pivotally secured to said support frame intermediate their end portions,
   link members connecting one end of each of said levers to said lower blade carrier,
   the other end of said levers having roller members positioned thereon arranged to ride on the peripheral edge of said disc members in a manner that upon rotation of said shaft said levers are pivoted by said protuberances to thereby move said lower shear blade carrier toward said upper shear blade carrier, and
   other means to urge said lower shear blade carrier away from said upper shear blade carrier.

2. In a device for shearing a moving strip of material the combination comprising,
   a support frame,
   a carriage pivotally connected at one end to said support frame and extending upwardly therefrom,
   said carriage having an upper blade carrier fixedly secured thereto and a lower blade carrier slidably positioned in said carriage below said upper blade carrier,
   actuating means connected to said lower blade carrier and arranged to move said lower blade carrier toward and away from said upper blade carrier,
   oscillating means to pivotally reciprocate said carriage so that said blade carriers oscillate through a predetermined arcuate path relative to said support frame, said path of said blade carriers being nearly rectilinear while the blade carriers are engaged for the shearing action,
   means connecting said actuating means and said oscillating means, said blade carriers oscillating while engaged for shearing action at a speed substantially equal to the moving strip,
   a shaft rotatably journaled in said supporting frame in lateral spaced relation to said carriage,
   a pair of disc members secured to said shaft for rotation therewith,
   said disc members positioned on said shaft in axial spaced relation thereto so that said discs follow a circular path greater than the radius of said respective discs,
   arm members having annular end portions with apertures therethrough having substantially the same diametrical dimension as said discs,
   said discs rotatably positioned in said arm member annular portions, and
   said arm member other end portions pivotally connected to said carriage in vertical spaced relation to said pivot connection between said carriage and said support frame so that upon rotation of said shaft said arm member reciprocates in a substantially rectilinear manner to oscillate said carriage.

3. In a shear device the combination comprising,
   a support frame,
   a carriage pivotally connected at one end to said support frame and extending upwardly therefrom,
   said carriage having an upper blade carrier fixedly secured thereto and a lower blade carrier slidably positioned in said carriage below said upper blade carrier,
   a shaft rotatably journaled in said supporting frame in lateral spaced relation to said carriage,
   a first pair of disc members coaxially positioned on said shaft and rotatable therewith,
   said first pair of disc members each having a protuberance thereon,
   a pair of levers pivotally secured to said support frame intermediate their end portions,
   a link member connecting one end of each of said levers to said lower blade carrier,
   the other end of said levers having roller members positioned thereon arranged to ride on the peripheral edge of said disc members in a manner that upon rotation of said shaft said levers are pivoted by said protuberance to thereby move said lower shear blade carrier toward said upper shear blade carrier,
   a second pair of disc members secured to said shaft for rotation therewith, said second pair of disc members positioned on said shaft in axial spaced relation so that said disc members follow a circular path greater than the radius of said disc members,
   arm members having annular end portions with apertures having substantially the same diametrical dimension as said discs,
   said discs rotatably positioned in said arm member annular portions,
   said arm member other end portions pivotally connected to said carriage in vertical spaced relation to said pivot connection between said support frame and said carriage so that upon rotation of said shaft said arm members reciprocate in a substantially horizontal manner to oscillate said carriage, and
   said first pair of disc members and said second pair of disc members positioned on said shaft in a manner that said carriage is moving in a substantially horizontal direction when said lower shear blade carrier is moved toward said upper shear blade carrier into shearing engagement therewith.

References Cited

UNITED STATES PATENTS 2,261,007  10/1941  Talbot _____ 83—316 X
2,829,713  4/1958  Nilsson _____ 83—316 X WILLIAM S. LAWSON, Primary Examiner